US012371903B2

United States Patent
Barbulescu et al.

(10) Patent No.: US 12,371,903 B2
(45) Date of Patent: Jul. 29, 2025

(54) CURTAIN WALL SYSTEM ACCOMMODATING WIRING

(71) Applicant: Arconic Technologies LLC, Pittsburgh, PA (US)

(72) Inventors: Ion-Horatiu Barbulescu, Marietta, GA (US); Gregory B. McKenna, Cumming, GA (US)

(73) Assignee: Arconic Technologies LLC, Pittsburgh, PA (US)

( * ) Notice: Subject to any disclaimer, the term of this patent is extended or adjusted under 35 U.S.C. 154(b) by 230 days.

(21) Appl. No.: 18/250,151

(22) PCT Filed: Nov. 11, 2021

(86) PCT No.: PCT/US2021/058950
§ 371 (c)(1),
(2) Date: Apr. 21, 2023

(87) PCT Pub. No.: WO2022/132349
PCT Pub. Date: Jun. 23, 2022

(65) Prior Publication Data
US 2023/0399844 A1    Dec. 14, 2023

Related U.S. Application Data

(60) Provisional application No. 63/127,298, filed on Dec. 18, 2020.

(51) Int. Cl.
*E04B 2/96* (2006.01)
(52) U.S. Cl.
CPC .............. *E04B 2/967* (2013.01); *E04B 2/965* (2013.01)

(58) Field of Classification Search
CPC ....................................................... E04B 2/967
See application file for complete search history.

(56) References Cited

U.S. PATENT DOCUMENTS 3,561,801 A * 2/1971 Chiu ..................... F16B 7/0446
403/264
3,778,175 A * 12/1973 Zimmer ................ E06B 3/9684
52/645

(Continued)

FOREIGN PATENT DOCUMENTS

| CN | 1164266 A | 11/1997 |
|---|---|---|
| CN | 200959989 Y | 10/2007 |

OTHER PUBLICATIONS

Written Opinion and International Search Report from corresponding PCT Application No. PCT/US2021/05850 mailed Mar. 4, 2022.

*Primary Examiner* — Joshua K Ihezie
(74) *Attorney, Agent, or Firm* — Vorys, Sater, Seymour and Pease LLP

(57) ABSTRACT

A system includes a structural member providing front and back faces, and first and second webs extending between the front and back faces and laterally offset from each other to define a hollow space therebetween. A wire transfer channel is defined at an end of the first web adjacent the front face and extends into the hollow space. A shear block provides a base, a connector portion extending from the base in a first direction, and first and second legs extending from the base in a second direction opposite the first direction, wherein the first and second legs are attachable to the first web to couple the shear block to the structural member.

19 Claims, 8 Drawing Sheets

(56) References Cited

U.S. PATENT DOCUMENTS

| | | | | |
|---|---|---|---|---|
| 4,830,531 | A * | 5/1989 | Condit | F16B 37/045 |
| | | | | 403/348 |
| 5,307,597 | A * | 5/1994 | Tanikawa | E06B 7/14 |
| | | | | 52/235 |
| 5,359,826 | A * | 11/1994 | Grearson | E04C 3/07 |
| | | | | 52/848 |
| 5,775,521 | A * | 7/1998 | Tisbo | A47B 17/033 |
| | | | | 211/11 |
| 5,839,236 | A * | 11/1998 | Frey | E04B 2/965 |
| | | | | 52/302.1 |
| 6,226,940 | B1 * | 5/2001 | Biebuyck | E04B 2/962 |
| | | | | 52/235 |
| 6,751,914 | B2 * | 6/2004 | Zeh | A47B 83/001 |
| | | | | 248/223.41 |
| 8,057,120 | B2 * | 11/2011 | Wernlund | F16B 7/18 |
| | | | | 403/264 |
| 8,800,221 | B1 * | 8/2014 | Header | E04B 2/88 |
| | | | | 52/220.8 |
| 9,567,746 | B1 * | 2/2017 | Barbulescu | H02G 3/388 |
| 2004/0031220 | A1 * | 2/2004 | Hocker | E04B 2/965 |
| | | | | 52/235 |
| 2006/0016137 | A1 * | 1/2006 | Ferro | E04B 2/965 |
| | | | | 52/235 |
| 2010/0011687 | A1 * | 1/2010 | Arias | E06B 3/5427 |
| | | | | 52/235 |
| 2021/0054679 | A1 * | 2/2021 | McKenna | E06B 3/549 |

\* cited by examiner

CURTAIN WALL SYSTEM ACCOMMODATING WIRING

BACKGROUND

Windows are commonly used in residential and commercial buildings, e.g., in storefronts and in curtain walls comprising the façade of high-rise buildings. The architecture of curtain walls typically includes a plurality of vertical structural members secured to a plurality of horizontal structural members, and the interconnected vertical and horizontal structural members are adapted to frame and hold glazing panels, such as panes of window glass, polycarbonates, or other clear, translucent, tinted, or opaque panels.

Some curtain wall assemblies use shear blocks to help attach adjacent horizontal and vertical structural members. The role of the shear blocks is to transfer the load from the horizontal to the vertical structural members. These loads include the weight of the glazing unit supported by the horizontal structural member.

Some devices installed on curtain walls require or generate electricity and, therefore, include attendant wiring to and from associated circuits inside and/or outside the building. For example, signage, power-generating devices (e.g., solar panels, power generating windmills, sunshades, etc.), electrochromic glass (or "smart glass"), sensors, lighting devices, automation actuators, and surveillance and communication devices (e.g., antennas), may each be attached to a curtain wall façade and require associated wiring.

Wiring on, in, or through a curtain wall, however, presents various challenges. For example, curtain wall wiring typically requires drilling through structural members, which can weaken the structural member and degrade weather intrusion resistance. Moreover, the wiring is unsightly and it is difficult to route wiring through the interior hollows of curtain walls, as this typically requires pushing or pulling wire through elongated hidden channels that often have constrictions and hidden obstacles. Furthermore, once a wired device is installed and the wiring is properly run, it is often difficult to trace a specific wire to remove or replace it. Curtain walls designed for easy installation of wiring are much needed products for today's facades. Alternative curtain wall systems, therefore, remain desirable.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Embodiments disclosed herein include a curtain wall system that includes structural member providing front and back faces, and first and second webs extending between the front and back faces and laterally offset from each other to define a hollow space therebetween, a wire transfer channel defined at an end of the first web adjacent the front face and extending into the hollow space, and a shear block providing a base, a connector portion extending from the base in a first direction, and first and second legs extending from the base in a second direction opposite the first direction, wherein the first and second legs are attachable to the first web to couple the shear block to the structural member. In a further embodiment, the first web defines raised ribs protruding outward from the first web, and wherein each leg defines a location channel alignable with a corresponding one of the raised ribs. In another further embodiment, the legs extend from the base and thereby define a wire channel between the base and the first web when the shear block is attached to the structural member, the system further including a wire extending through the wire channel and along the first web. In another further embodiment, each leg includes a flange extending from the base in the second direction, a support surface extending from the flange, wherein the location channel is defined in the support surface, and a return member extending from the support surface in the first direction. In another further embodiment, the connector portion includes opposing sidewalls extending from the base in the first direction and terminating at an end wall extending between the sidewalls, and wherein the return member of each head extends parallel to and laterally offset from a corresponding one of the sidewalls, thereby defining a relief between each laterally adjacent return member and sidewall. In another further embodiment, a distal end of the return member tapers laterally inward toward an adjacent sidewall. In another further embodiment, the system further includes a wiring hole defined in the front face to accommodate a wire extending into the wire transfer channel from an exterior. In another further embodiment, a lateral end of each face provides a cover engagement feature, the system further including a wire extending along the first web, and a raceway cover removably coupled to the cover engagement features and extending across the first web and thereby occluding the wire. In another further embodiment, the structural member is a first structural member, the system further comprising a second structural member providing front and back faces, and first and second webs extending between the front and back faces of the second structural member, the first and second webs of the second structural member being laterally offset from each other to define a hollow space therebetween, wherein the connector portion is matingly received within the hollow space of the second structural member. In another further embodiment, each leg includes a flange extending from the base in the second direction, a support surface extending from the flange, and a return member extending from the support surface in the first direction, and wherein raised shoulders are defined within the hollow space and engageable with the return member of each leg. In another further embodiment, the connector portion includes opposing sidewalls extending from the base in the first direction and terminating at an end wall extending between the sidewalls, and wherein the return member of each head extends parallel to and is laterally offset from a corresponding one of the sidewalls, thereby defining a relief between each laterally adjacent return member and sidewall, the system further comprising a wire router mounted to the shear block at the reliefs. In another further embodiment, the wire router includes first and second heads, one or more cross bars extending between the first and second heads, and an attachment mechanism provided on each head and at least partially receivable within the reliefs to removably couple the wire router to the shear block. In another further embodiment, the legs extend from the base and thereby define a wire channel between the base and the first web when the shear block is attached to the first structural member, the system further including a wire extending through the wire channel along the first web of the first structural member and turning to extend along the first web of the second structural member. In another further embodiment, the system further includes a raceway cover removably coupled to one of the first and second structural members and extending across the first web of the one of the first and second structural members and thereby occluding the wire.

Embodiments disclosed herein also include a curtain wall system that includes a first structural member providing front and back faces, and first and second webs extending between the front and back faces, the first and second webs defining a first hollow space therebetween, wherein a wire transfer channel is defined at an end of the first web adjacent the front face and extending into the first hollow space, a shear block attached to the first web and providing a base, a connector portion extending from the base in a first direction, and first and second legs extending from the base in a second direction opposite the first direction, and a second structural member defining a second hollow space that matingly receives the connector portion. In a further embodiment, the first web defines raised ribs protruding outward from the first web, and wherein each leg defines a location channel aligned with a corresponding one of the raised ribs. In another further embodiment, each leg includes a flange extending from the base in the second direction, a support surface extending from the flange, and a return member extending from the support surface in the first direction, and wherein raised shoulders are defined within the second hollow space and engageable with the return member of each leg. In another further embodiment, the connector portion includes opposing sidewalls extending from the base in the first direction and terminating at an end wall extending between the sidewalls, and wherein the return member of each head extends parallel to and is laterally offset from a corresponding one of the sidewalls, thereby defining a relief between each laterally adjacent return member and sidewall, the system further comprising a wire router mounted to the shear block at the reliefs. In another further embodiment, the legs extend from the base and thereby define a wire channel between the base and the first web, the system further including a wire extending through the wire channel along the first web and turning to extend along the second structural member. In another further embodiment, the system further includes a raceway cover removably coupled to one of the first and second structural members and thereby occluding the wire.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to building products and, more particularly, to window structures, window frames, curtain walls, and curtain wall assemblies that incorporate a shear block designed to facilitate easy wiring at the joints between horizontal and vertical structural members.

Embodiments discussed herein describe curtain wall or window wall assemblies designed to allow easy wiring to and from the systems attached to a curtain wall/window wall; e.g., signage, power-generating devices, electrochromic glass, sensors, lighting devices, automation actuators, surveillance and communication devices, etc. The embodiments described herein may be designed specifically for devices requiring wiring management and may provide direct access to the wire across the whole façade of a building. Wiring can be done pre- or post-installation of the wired devices and the wires may be fully concealed. Furthermore, any drilling required to install the wiring is greatly reduced, and after installation the wiring may be easily removed or replaced.

Some or all of the foregoing advantages may be obtained by incorporating the various shear block designs described herein and configured to couple horizontal and vertical structural members. The presently disclosed shear blocks allow for easy wiring at the intersection between the horizontal and vertical structural members (even after the shear blocks are installed), and allow for direct wiring to desired locations without the need to push or pull the wires through tortuous pathways. The designs mitigate or eliminate interference between the wiring and the shear blocks or structural members during installation.

Figure 1:
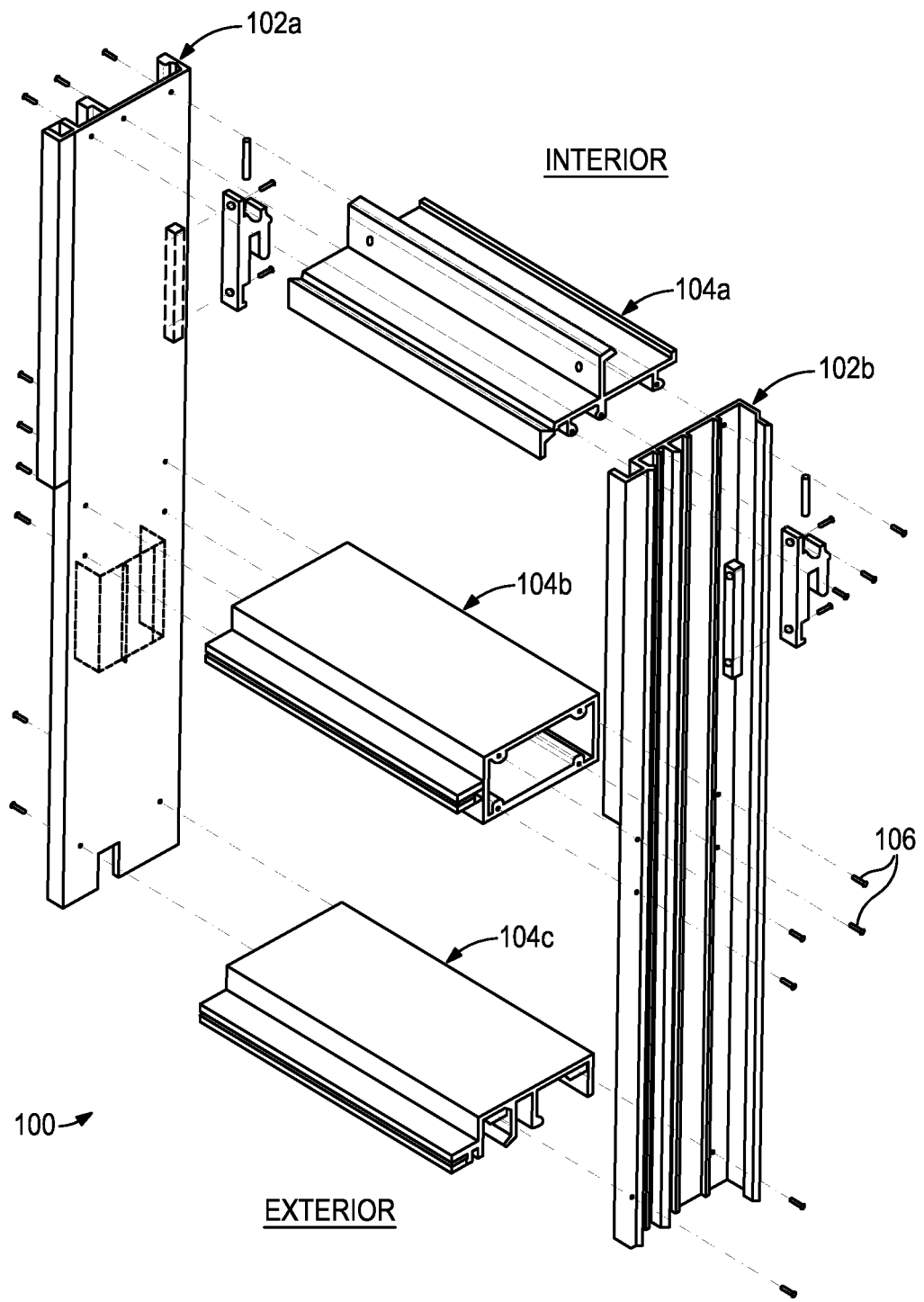
FIG. 1 is an exploded, perspective view of a prior art curtain wall chassis subassembly.

FIG. 1 is an isometric exploded view of a prior art window or curtain wall chassis subassembly 100. The chassis subassembly 100 may form part of a window or curtain wall system for a residential or commercial building. The chassis subassembly 100 may be made for installation in a large commercial building, such as a skyscraper, but could alternatively be applied to smaller commercial or residential buildings, without departing from the scope of the disclosure. The principles of the present disclosure, however, are equally applicable to all types of fenestration systems.

As illustrated, the chassis subassembly 100 may include vertical structural members 102a and 102b, and horizontal structural members 104a, 104b, and 104c. Alternatively referred to as "mullions," the vertical and horizontal structural members 102a,b and 104a-c may be extruded from an aluminum alloy, which is strong, lightweight and corrosion-resistant, but may alternatively be formed of other materials, such as other metals and metal alloys or a composite material. The structural members 102a,b, 104a-c may be adapted to cooperatively frame and hold a panel, such as a pane of window glass, polycarbonate, or another clear, translucent, tinted, or opaque panel. In at least one embodiment, the vertical and horizontal structural members 102a,b, 104a-c may be adapted to frame and hold a plurality of glazing panels (e.g., the glazing panels 208a-208j of FIG. 2).

In the illustrated application, the vertical and horizontal structural members 102a,b, 104a-c are joined using one or more fasteners 106 to form the chassis subassembly 100. The fasteners 106 may include, but are not limited to, screws, rivets, welds, other known mechanical fastening means, or any combination thereof. As described in more detail below, other systems use shear blocks to join vertical and horizontal structural members 102a,b, 104a-c.

Figure 2:
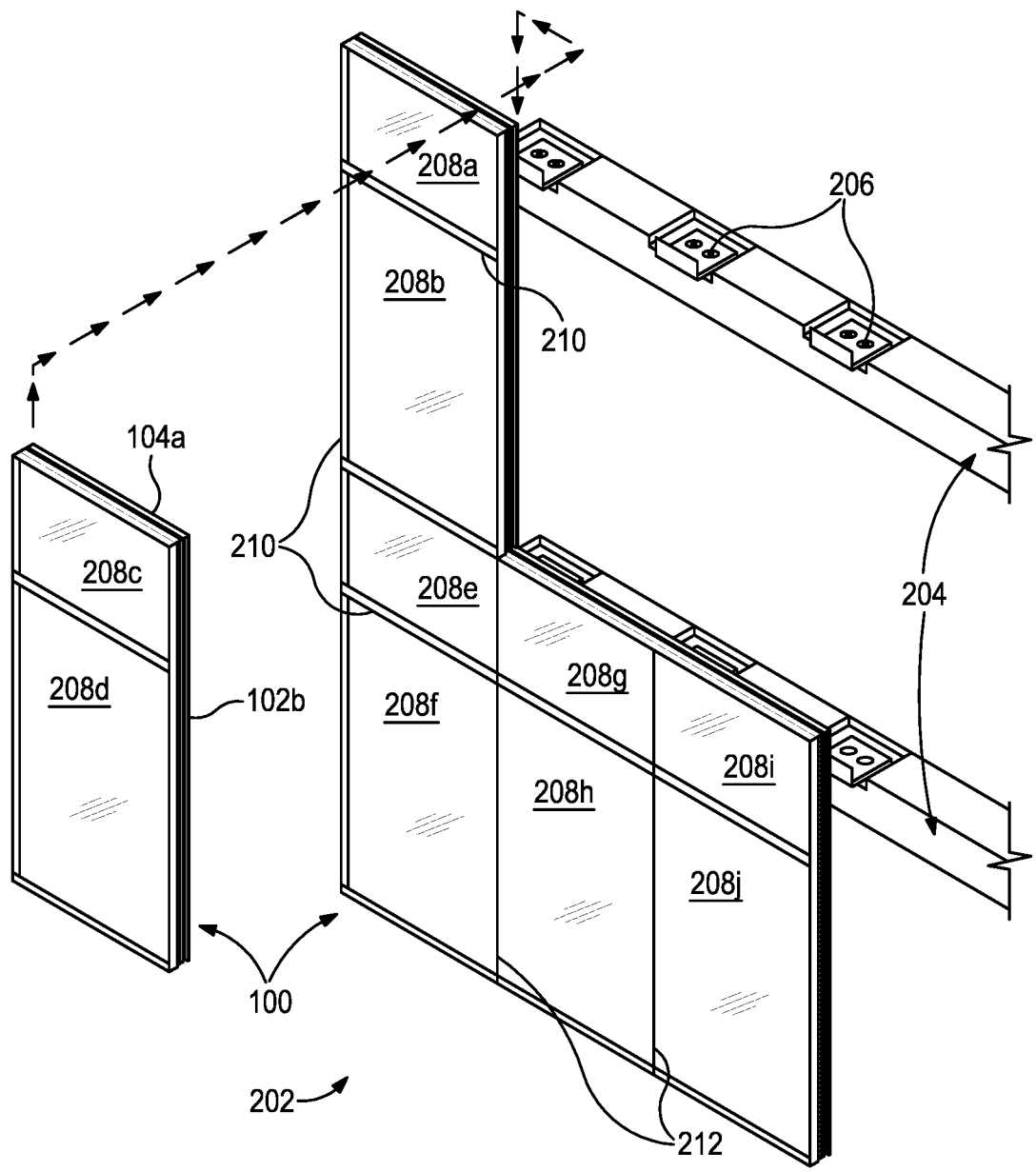
FIG. 2 is an isometric view of a plurality of chassis subassemblies assembled to form a portion of a curtain wall system.

FIG. 2 is an isometric view of a plurality of chassis subassemblies 100 assembled to form a portion of a window system 202, alternately referred to as a "curtain wall." The window system 202 may be secured to a building structure, such as one or more beams 204 that form part of the building structure. The chassis subassemblies 100 may be coupled to one another and to one or more brackets 206 secured to the beams 204.

The chassis subassemblies 100 have a plurality of glazing panels 208a-208j (e.g., glass), alternately referred to as "glazing units," installed therein between the vertical and horizontal structural members (102b and 104a indicated). In modern construction, the glazing panels 208a-j are typically double or triple glazed with air, an inert gas, and/or a plastic film(s) between adjacent panels to control transmission of thermal energy by radiation and convection between the interior of the building and the exterior environment. In some applications, the glazing panels 208a-j may be secured to the corresponding chassis subassemblies 100 by way of a silicone adhesive/sealant or structural tape. In other embodiments, however, one or more cover elements or "covers" 210 may be utilized to provide an architectural finishing detail between adjacent glazing panels 208a-j and/or provide a mechanism for supporting the glazing panels 208a-j in place on the window system 202.

Figure 3:
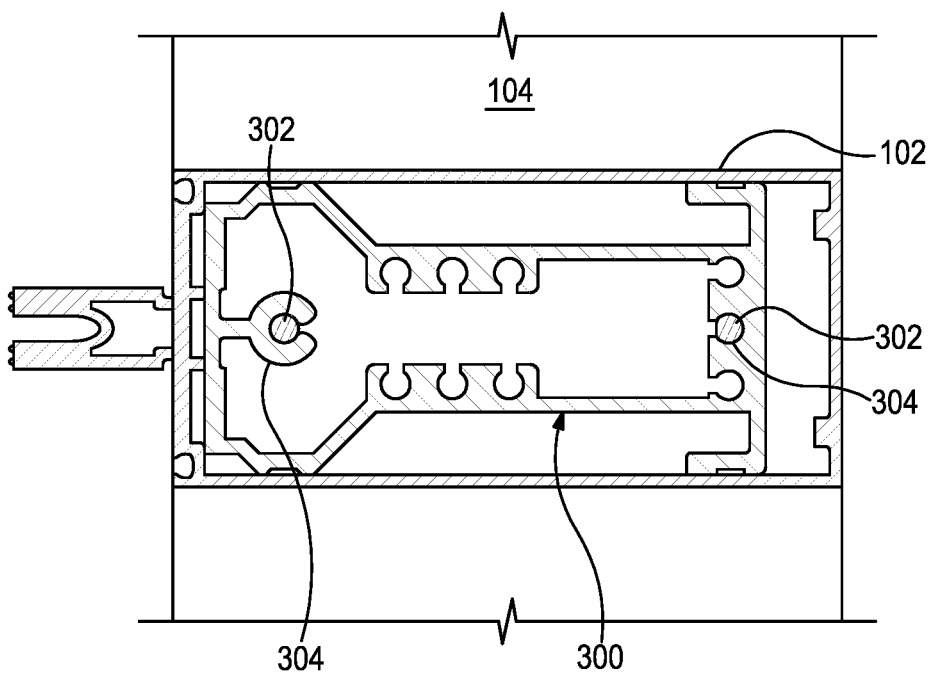
FIG. 3 is a schematic, cross-sectional side view of a prior art shear block used to help attach a horizontal structural member to a vertical structural member.

FIG. 3 is a schematic, cross-sectional side view of a prior art shear block 300 that may be used to help attach a horizontal structural member 102 to a vertical structural member 104. As illustrated, the shear block 300 may be received within the horizontal structural member 102, and attached to the vertical member 104 using one or more mechanical fasteners 302 (two shown) received within corresponding apertures 304.

Figure 4:
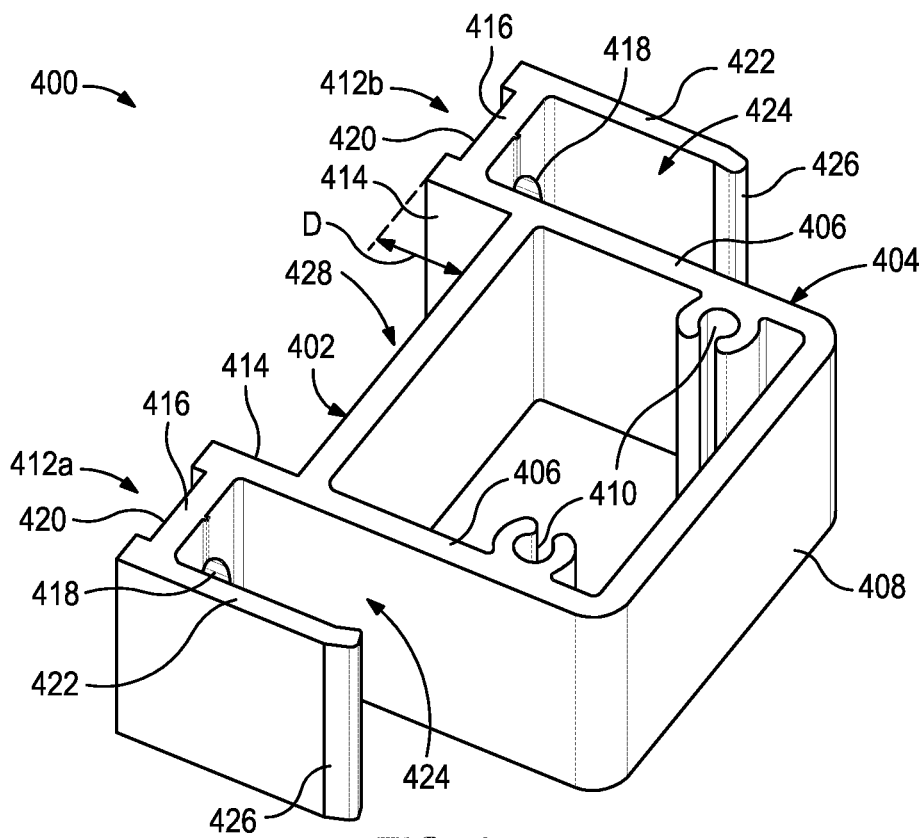
FIG. 4 is an isometric view of an example shear block in accordance with one or more embodiments of the present disclosure.

FIG. 4 is an isometric view of an example shear block 400 in accordance with one or more embodiments of the present disclosure. As illustrated, the shear block 400 exhibits a generally rectangular shape and includes a base 402 and a connector portion 404 extending from the base 402. The connector portion 404 provides opposing sidewalls 406 that extend substantially perpendicular from the base 402 in a first direction and terminate at an end wall 408. The end wall 408 is arranged substantially parallel to the base 402 and extends between the sidewalls 406. In some embodiments, one or more fastener apertures 410 may be provided or otherwise defined on one or both of the sidewalls 406. The fastener aperture(s) 410 may be configured to receive a corresponding mechanical fastener (e.g., a bolt, a screw, a rivet, etc.) used to secure a structural member (not shown), such as a horizontal structural member, to the shear block 400.

The shear block 400 may further provide or otherwise define first and second legs 412a and 412b that extend from the base 402 in a second direction opposite the first direction. Each leg 412a,b may include a flange 414 extending substantially perpendicular from the base 402, and a support surface 416 extending substantially perpendicular from the flange 414. The support surfaces 416 may extend substantially parallel to the base 402 and laterally outward in opposite lateral directions. Each support surface 416 may provide a location where the shear block 400 may be attached to a structural member (not shown), such as a vertical structural member. To help accomplish this, one or more shank apertures 418 (partially visible) may be defined in each support surface 416 and configured to receive a corresponding mechanical fastener (e.g., a bolt, a screw, a rivet, etc.) used to secure the shear block 400 to the adjoining structural member.

In some embodiments, as illustrated, each support surface 416 may further define a location channel 420 that extends along the height of the support surface 416. The location channel 420 comprises a recessed portion of the support surface 416 configured to align with a corresponding raised rib defined on an adjacent structural member (not shown), such as a vertical structural member. Mating the location channels 420 with adjacent raised ribs helps properly align the shear block 400 with the adjoining structural member.

Each leg 412a,b may further provide or define a return member 422 extending substantially perpendicular from the support surface 416 in the first direction. Each return member 422 may extend substantially parallel to and laterally offset from a corresponding one of the sidewalls 406 of the connector portion 404, thereby defining corresponding reliefs 424 between laterally adjacent return members 422 and sidewalls 406. The reliefs 424 may provide open access to install a mechanical fastener at the corresponding shank aperture(s) 418 defined in each support surface 416.

In some embodiments, a distal end 426 of one or both of the return members 422 may be curved, angled, tapered, and otherwise extend laterally inward toward the adjacent sidewall 406. The tapered distal ends 426 may prove advantageous when attempting to mate a structural member (not shown), such as a horizontal structural member, with the shear block 400. In such applications, the shear block 400 will be received within a hollow space of the structural member and the return members 422 may engage corresponding raised shoulders defined within the hollow space. The tapered distal ends 426 of the return members 422 provide lead-in surfaces that help prevent the return members 422 from catching on the raised shoulders and otherwise complicating the installation process.

In some embodiments, the legs 412a,b (i.e., the flanges 414) may extend a distance D from the base 402 and thereby define a wire channel 428. When the shear block 400 is mounted to an adjoining vertical structural member, the wire channel 428 may be configured to allow wires to pass between the shear block 400 and the vertical structural member. The wire channel 428 may also prove advantageous in allowing wires and wiring to pass through joints between vertical and horizontal structural elements while avoiding interference with the horizontal structural elements at installation. Consequently, no pushing or pulling of the wiring around mullion joints is required.

Figure 5:
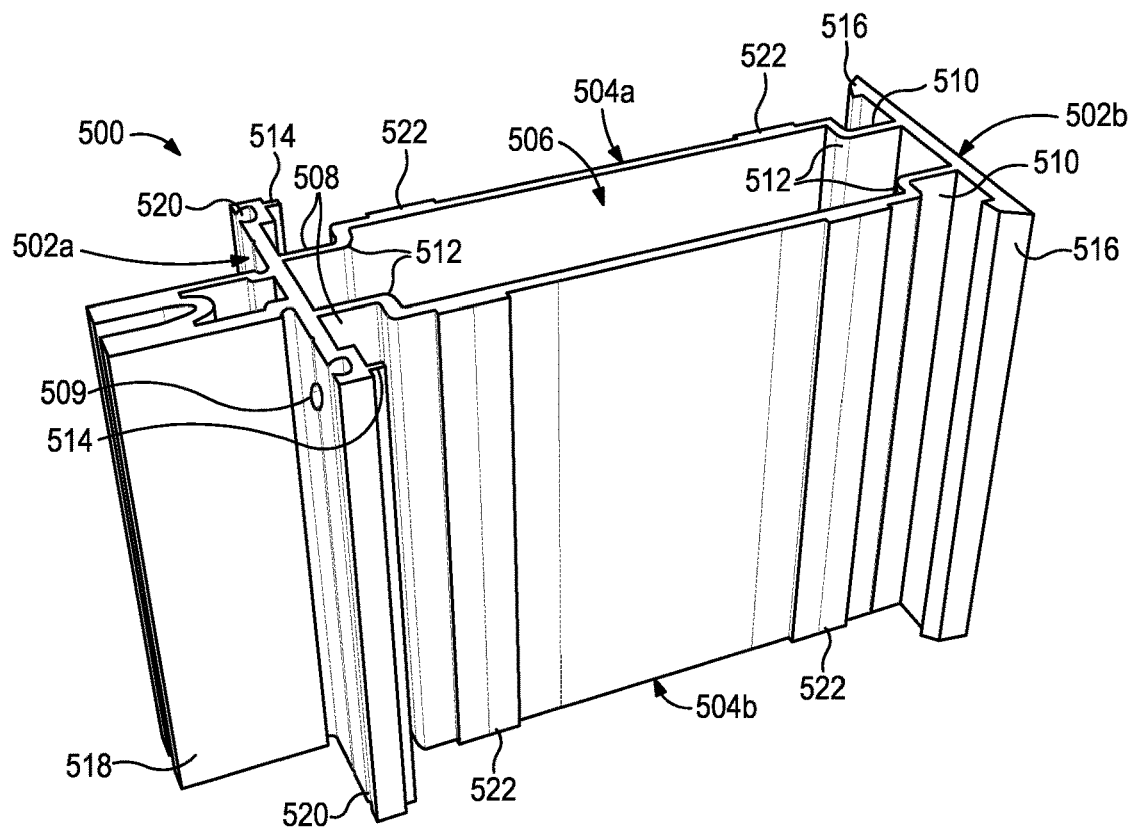
FIG. 5 is an isometric side view of an example structural member, according to one or more embodiments.

FIG. 5 is an isometric side view of an example structural member 500, according to one or more embodiments. The structural member 500 may be similar in some respects to either of the vertical or horizontal structural members 102a,b, 104a-c of FIGS. 1-3 and may thus be oriented in either orientation, e.g., vertically or horizontally. Moreover, the structural member 500 may function as a mullion in a window system or curtain wall and, therefore, may be used in the window system 202 of FIG. 2. As shown, the structural member 500 may be formed as a monolith, e.g., as an aluminum alloy extrusion, but could alternatively be made of other materials, without departing from the scope of the disclosure.

As illustrated, the structural member 500 may include front and back faces 502a and 502b, and first and second webs 504a and 504b that extend between the front and back faces 502a,b. The front and back faces 502a,b may be arranged substantially parallel to each other, and the webs 504a,b may extend substantially perpendicular to the front and back faces 502a,b. The webs 504a,b may be laterally offset from each other such that a hollow space 506 is defined therebetween.

In some embodiments, a wire transfer channel 508 may be defined or otherwise provided at the end of each web 504a,b adjacent the adjoining front face 502a and extend along the length of the structural member 500. The wire transfer channels 508 extend a short distance into the hollow space 506 to provide a location to feed wiring from a glazing panel (not shown) attached to the structural member 500 at the front face 502a to the inside. The wire transfer channels 508 may prove advantageous in providing clearance for a drill to make wiring holes 509 (one shown) that facilitate passage of wiring through the front face 502a to connect electrical devices on the exterior (glazing area) of the system. The depth of the wire transfer channels 508 are designed so that when drilling, the drill bit stops upon engaging the webs 504a,b and thereby protects any existing wires that may be extending along the webs 504a,b from being damaged by the drill bit.

In some embodiments, other wire transfer channels 510 may be defined or otherwise provided at the opposite end of each web 504a,b adjacent the adjoining back face 502a. Similar to the wire transfer channels 508, the wire transfer channels 510 extend a short distance into the hollow space 506 and may be configured to accommodate wires or wiring.

Because the wire transfer channels 508, 510 extend a short distance into the hollow space 506, corresponding raised shoulders 512 may be being defined within the hollow space 506 (interior) of the structural member 500. In embodiments where the structural member 500 is a horizontal structural member, the raised shoulders 512 may be configured to engage the shear block 400 (FIG. 4) upon receiving the shear block 400 within the hollow space 506 during installation. More specifically, the raised shoulders 512 may be configured to engage the return members 422 (FIG. 4) of the shear block 400 and thereby provide a close-fit engagement that helps guide and center the structural member 500 onto the shear block 400. Moreover, as indicated above, the tapered distal ends 426 (FIG. 4) of the return members 422 help ease installation of the structural member 500 by preventing the return members 422 from catching on the raised shoulders 512 as the structural member 500 advances over the shear block 400.

In some embodiments, the opposing ends of front and back faces 502a,b may provide or otherwise define cover engagement features configured to help secure a raceway cover (not shown) across each web 504a,b. More specifically, the lateral ends of the front face 502a may define corresponding raised lips 514 extending along the length of the front face 502a, and the lateral ends of the back face 502b may define corresponding tapered surfaces 516 extending along the length of the back face 502b. The raised lips 514 and the tapered surfaces 516 may be used to attach a raceway cover (not shown) extending between the front and back face 502a,b and covering the underlying web 504a,b. The raceway cover will also serve to occlude any wires or wiring extending along the webs 504a,b.

A glazing panel support tongue 518 extends from the front face 502a along the length of the support member 500 and functions as a lip upon which a glazing panel (not shown) may rest, as well as an attachment structure for a cover element (not shown) for covering the edge of the glazing panel. The lateral ends of the front face 502a may further provide or define a gasket recess 520 configured to receive a corresponding gasket (not shown) that helps form a seal with a glazing unit (not shown).

In some embodiments, as illustrated, each web 504a,b may provide or define one or more raised ribs 522 (two shown) that extend along the length of the structural member 500. The raised ribs 522 protrude outward past the generally planar surface of the corresponding web 504a,b and thereby provide a location where the shear block 400 (FIG. 4) may be aligned with the structural member 500. More specifically, as discussed above, the location channels 420 (FIG. 4) defined on each support surface 416 (FIG. 4) may be configured to align with a corresponding raised rib 522, and thereby help properly align the shear block 400 with the structural member 500 at the corresponding web 504a,b.

Figure 6:
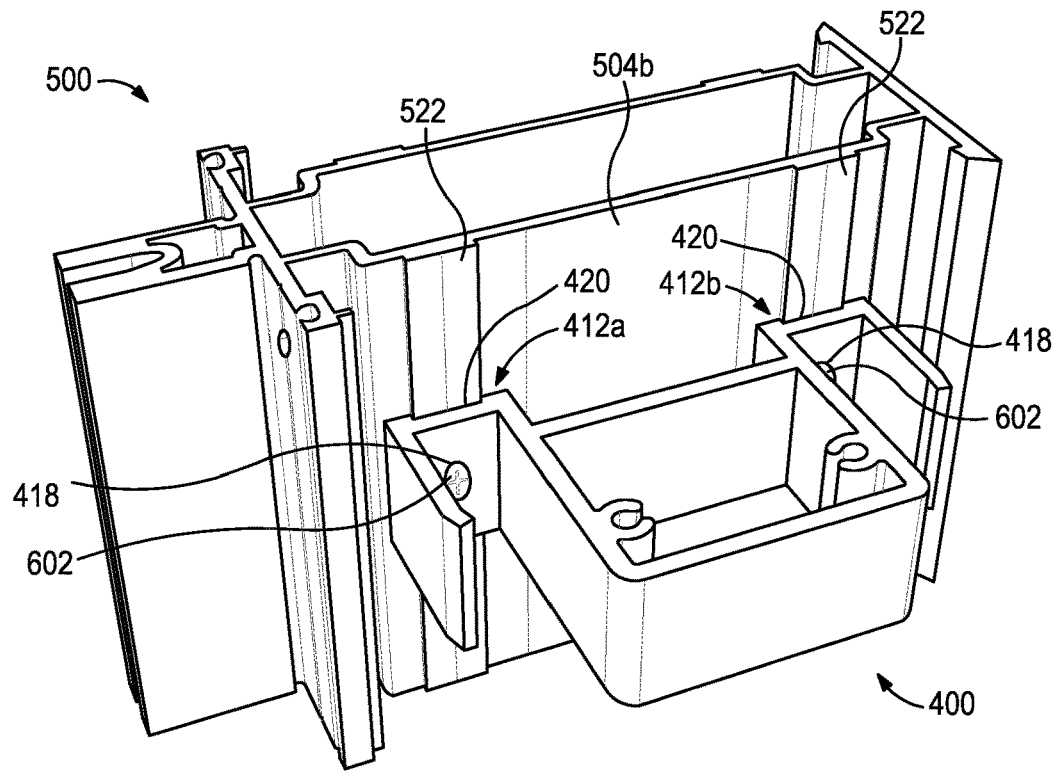
FIG. 6 is an isometric side view of demonstrating example attachment of the shear block of FIG. 4 to the structural member of FIG. 5, according to one or more embodiments.

FIG. 6 is an isometric side view demonstrating example attachment of the shear block 400 to the structural member 500, according to one or more embodiments. In the illustrated embodiment, the structural member 500 is operating as a vertical structural member, and the shear block 400 is attached to the vertical structural member 500 in preparation for receiving a horizontal structural member over the shear block 400 and thereby forming a joint with the vertical structural member 500.

As illustrated, the shear block 400 may be attached to the vertical structural member 500 by aligning the legs 412a,b of the shear block 400 with the raised ribs 522 provided on the adjacent web 504b of the vertical structural member 500. More specifically, the location channels 420 may be aligned with adjacent raised ribs 522 and the shear block 400 is advanced to receive the raised ribs 522 within the location channels 420. The shear block 400 may then be attached to the vertical structural member 500 using one or more mechanical fasteners 602 (e.g., a bolt, a screw, a rivet, etc.) received through corresponding shank apertures 418.

Figure 7:
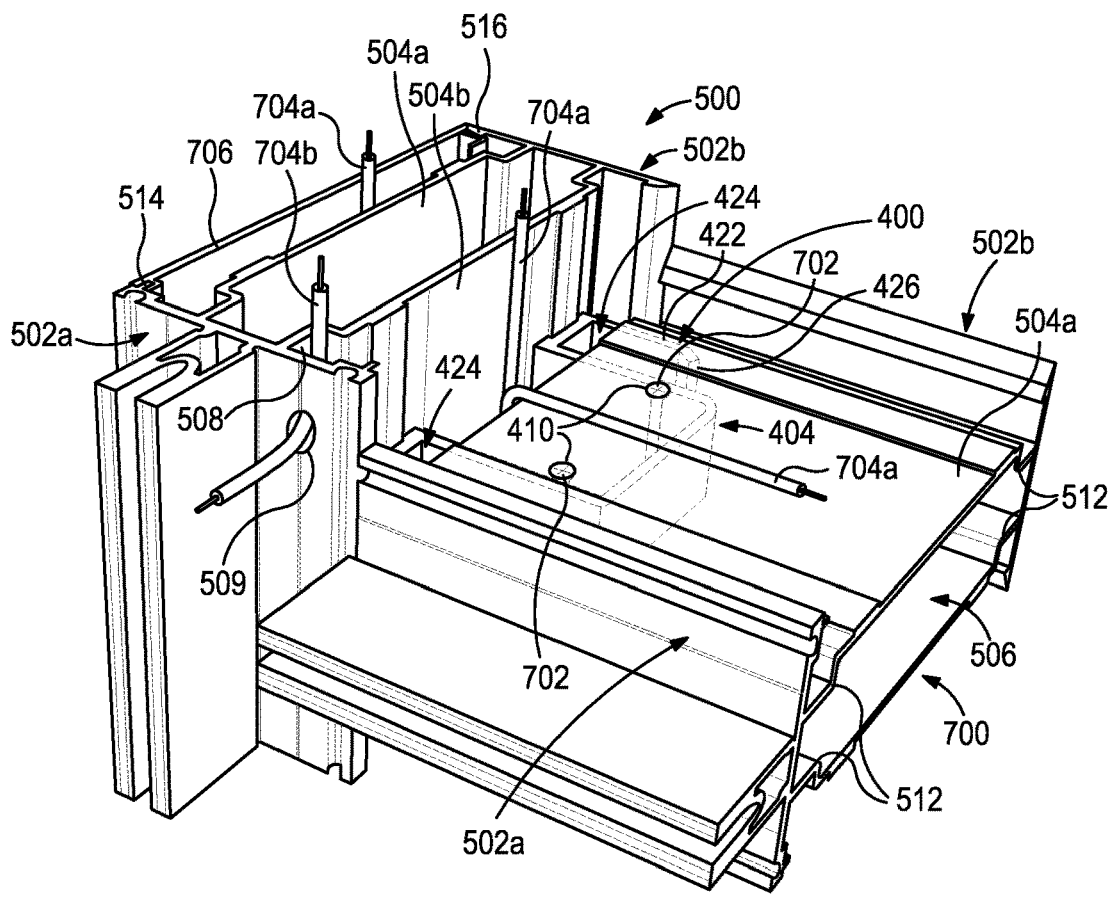
FIG. 7 is an isometric side view demonstrating example attachment of an example horizontal structural member to the shear block 400 of FIG. 4, according to one or more embodiments.

With continued reference to FIG. 6, FIG. 7 is an isometric side view demonstrating example attachment of an example horizontal structural member 700 to the shear block 400, according to one or more embodiments. The horizontal structural member 700 may be of the same design as the vertical structural member 500 and, therefore, the horizontal structural member 700 may be best understood with reference to the description of the vertical structural member 500, where like numerals will represent like components not described again in detail.

As illustrated, the shear block 400 is attached to the vertical structural member 500, as generally described above, and now the horizontal structural member 700 may be secured to the shear block 400 by receiving the connector portion 404 (shown in dashed lines) of the shear block 400 within the hollow space 506 of the horizontal structural member 700. The tapered distal ends 426 of the return members 422 can help ease installation of the horizontal structural member 700 by preventing the return members 422 from catching on the raised shoulders 512 within the hollow space 506 of the horizontal structural member 700. Moreover, the raised shoulders 512 may be configured to engage the return members 422 and thereby provide a close-fit engagement that helps guide and align the horizontal structural member 700 with the vertical structural member 500.

The horizontal structural member 700 may be advanced toward the vertical structural member 500 until engaging or coming into close contact with the vertical structural member 500. Once properly aligned, one or more mechanical fasteners 702 (e.g., a bolt, a screw, a rivet, etc.) may be used to secure the horizontal structural member 700 to the shear block 400 by receiving the mechanical fasteners 702 in the corresponding fastener apertures 410 provided by the connector portion 404.

As illustrated, one or more first wires 704a may extend within the wire channel 428 defined between the legs 412a,b of the shear block 400 and the face of the web 504b of the vertical structural member 500. One or more of the wires 704 may continue extending vertically along the face of the web 504b, while others may be bent to extend horizontally along the upper surface of the web 504a of the horizontal structural member 700. The wire channel 428 allows the first wires 704a to pass through the joint between the vertical and horizontal structural members 500, 700 and avoid interference with the horizontal structural member 700 during or after installation. Moreover, because the wire channel 428 is generally unobstructed, there is no need to push or pull the first wires 704a through tortuous pathways to properly run the first wires 704a.

One or more second wires 704b (one shown) may extend within the wire transfer channels 508 defined at the end of the webs 504a,b of the adjacent the adjoining front face 502a of the vertical structural member 500. More specifically, the second wire(s) 704b may extend through corresponding wiring holes 509 and thereby extend to various electrical devices attached to the exterior of the curtain wall, such as a glazing panel (not shown) attached to the vertical and horizontal structural members 500, 700. In some applications, once penetrating the front face 502a to access the transfer channel 508, the second wire(s) 704b may exit the wire transfer channel 508 and extend horizontally along the upper surface of the web 504a of the horizontal structural member 700.

The wires 704a,b may be run to and from devices that require power or generate power. Once the wires 704a,b are properly run, a raceway cover 706 may be installed across each exposed web 504a,b, between the opposing faces 502a,b of each structural member 500, 700, and thereby conceal (hide) the wires 704a,b. In the illustrated embodiment, the raceway cover 706 is installed to cover the first web 504a of the vertical structural member 500 and thereby conceal one of the first wires 704a extending vertically along the web 504a. More specifically, the raceway cover 706 extends between the opposing faces 502a,b of the vertical structural member 500 and is secured thereto via engagement with the raised lip 514 provided at the front face 502a and the tapered surface 516 provided at the back face 502b. Engagement of the raceway cover 706 at the faces 502a,b may comprise a removable engagement. Consequently, if any of the wires 704a,b need to be replaced or repaired at any time, the raceway cover 706 can be removed to provide easy and convenient access to the wires 704a,b. Also, the raceway cover 706 may be removed if needed for installing additional wires required by additional devices. Accordingly, the design of the system allows easy and direct wiring of the full façade of a curtain wall before or after installation of the shear block 400 and the horizontal structural member 700.

In some embodiments, with the horizontal structural member 700 properly installed on the shear block 400, a portion of the reliefs 424 defined between the return member 422 the laterally adjacent sidewall 406 of the connector portion 404 may be exposed. The exposed portion of the reliefs 424 may provide a location to attach a wire router (not shown) to the shear block 400 at the joint between the vertical and horizontal structural members 500, 700. The wire router may be designed to hold and guide the wires 704a,b at the joints between the vertical and horizontal structural members 500, 700. Moreover, the wire router may also help to protect the wires 704a,b from being cut or damaged on sharp edges or ends of the vertical and horizontal structural members 500, 700.

Figure 8:
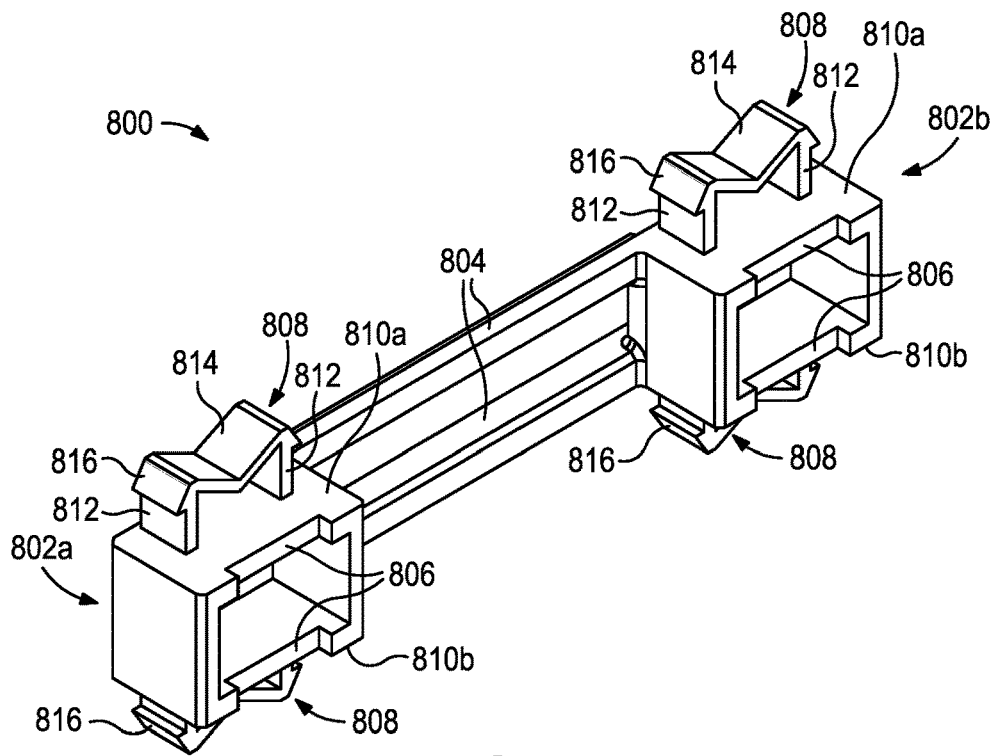
FIG. 8 is an isometric side view of an example wire router, according to one or more embodiments of the disclosure.

FIG. 8 is an isometric side view of an example wire router 800, according to one or more embodiments of the disclosure. The wire router 800 may be made of a variety of rigid or semi-rigid materials including, but not limited to, a metal (e.g., aluminum), a thermoplastic (e.g., acrylonitrile butadiene styrene or ABS), a composite material, or any combination thereof.

As illustrated, the wire router 800 may provide or otherwise define first and second heads 802a and 802b laterally offset from each other, and one or more cross bars 804 (two shown) may extend between the heads 802a,b. In some embodiments, the heads 802a,b may be generally arranged to align with the raised ribs 522 (FIGS. 5-6) provided on an adjacent web 504a,b (FIGS. 5-7) of the vertical structural member 500 (FIGS. 5-7). In such embodiments, a groove 806 may be defined in each head 802a,b and configured to be aligned with and receive an adjacent raised rib 522, which helps to properly align the wire router 800.

An attachment mechanism 808 may be defined or otherwise provided on one or both heads 802a,b and may be configured to help attach the wire router 800 to an installed shear bock (e.g., the shear block 400 of FIGS. 4, 6, and 7). In the illustrated embodiment, the attachment mechanism 808 is provided on a top 810a and a bottom 810b of each head 802a,b, but could alternatively be provided on only the top 810a, only the bottom 810, or any combination thereof. In the illustrated embodiment the attachment mechanism 808 provides parallel legs 812 extending from the top or bottom 810a,b and a compliant member 814 extends between the parallel legs 812. The compliant member 814 may allow the legs 812 to flex toward each other when installing the wire router 800, and provide spring force to urge the legs 812 back away from each other upon removing the wire router 800.

To install the wire router 800 on a shear bock (e.g., the shear block 400 of FIGS. 4, 6, and 7), the attachment mechanism(s) 808 may be received within the exposed portion of the reliefs 424 (FIGS. 4 and 7). As the attachment mechanism(s) 808 extends into the corresponding relief 424, the legs 812 may flex inward toward one another. In some embodiments, the attachment mechanism(s) 808 may form an interference fit with the adjacent relief 424, and thereby couple the wire router 800 to the shear block 400. In other embodiments, however, the attachment mechanism(s) 808 may define a tapered surface 816 that provides a lead-in and snap fit engagement with the adjacent relief 424. In either embodiment, the wire router 800 may be removably attached to the shear block 400 and thus able to be removed as needed.

Figure 9A:
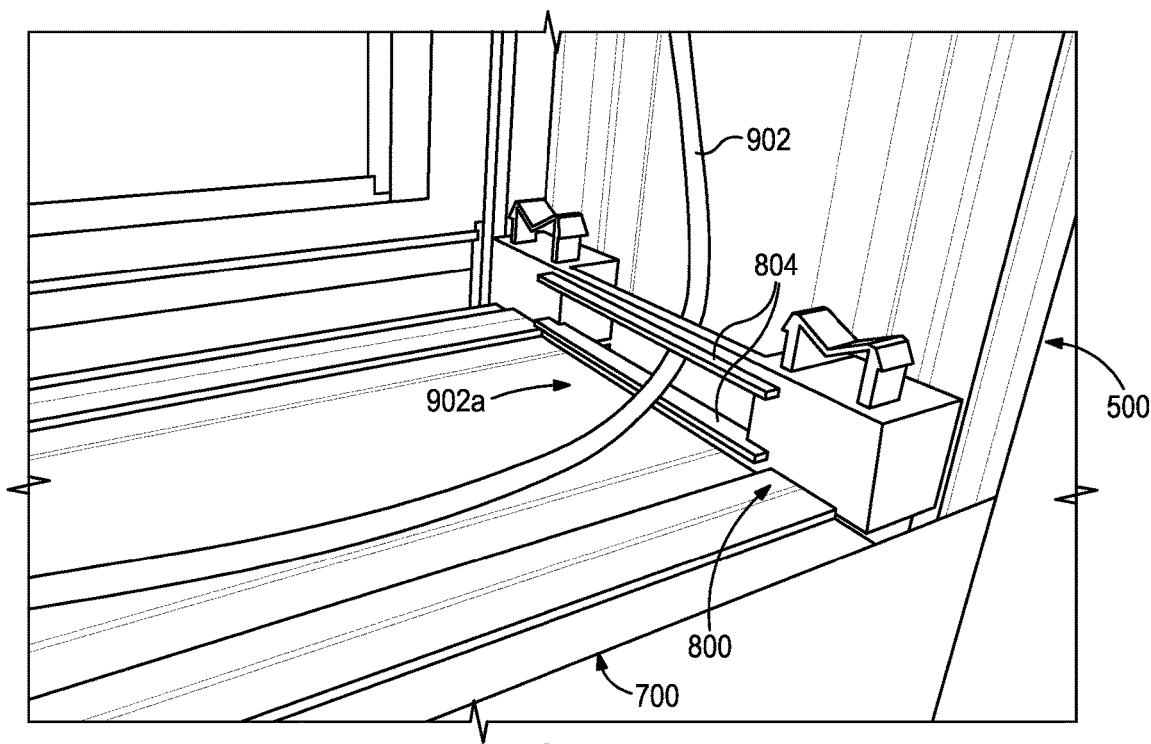
FIGS. 9A and 9B are schematic isometric views of the wire router of FIG. 8 installed, according to one or more embodiments.
Figure 9B:
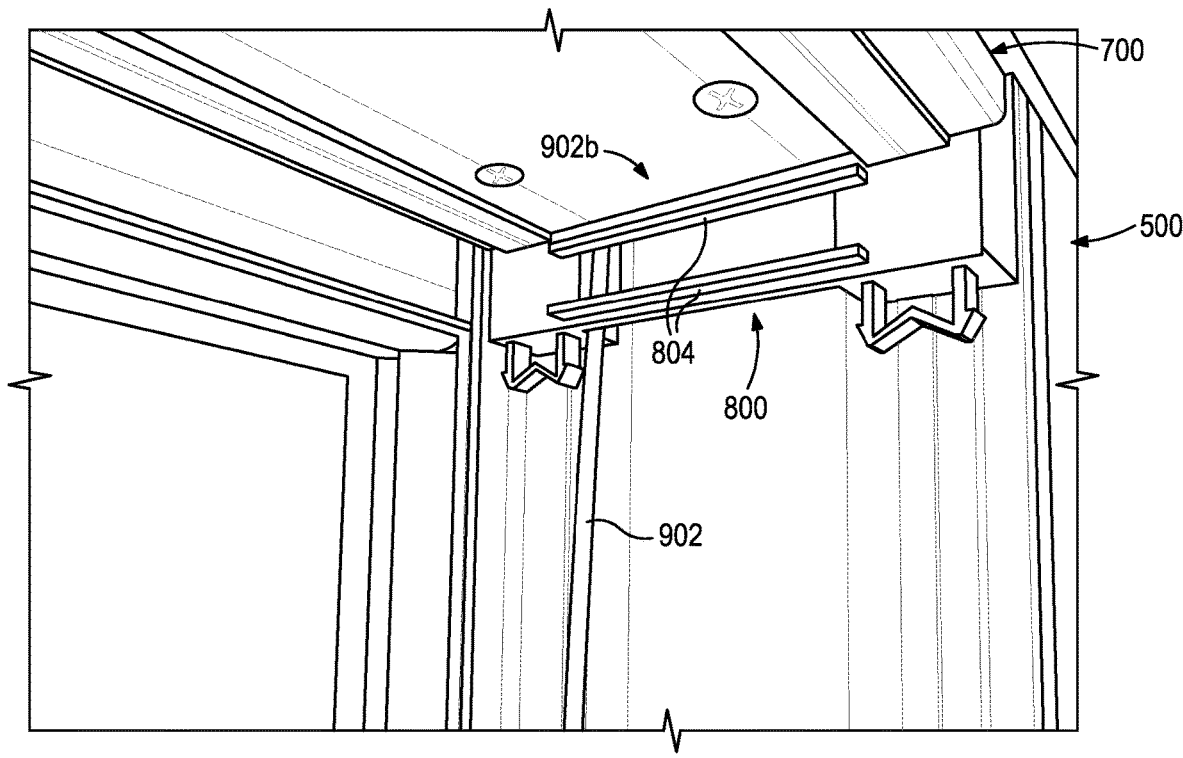

FIGS. 9A and 9B are schematic isometric views of the wire router 800 installed, according to one or more embodiments. More specifically, FIGS. 9A-9B depict the wire router 800 installed at a joint between vertical and horizontal structural members, such as the vertical and horizontal structural members 500, 700. In FIG. 9A, the wire router 800 is installed at a lower joint 902a between the vertical and horizontal structural members 500, 700, and in FIG. 9B the wire router 800 is installed at an upper joint 902b between the vertical and horizontal structural members 500, 700. The wire router 800 is installed as generally described above.

As illustrated, the wire router 800 may be configured to hold and guide a wire 902 at the joints 902a,b. In the embodiment of FIG. 9A, for example, the wire router 800 may be configured to redirect the wire 902 from horizontal to vertical, or vice versa. In such embodiments, the wire 902 may extend through a gap between the cross bars 804, and the cross bars 804 may exhibit rounded or smooth protective edges that protect the wire insulation at the bends. Whether there are two cross bars 804 or one, the wire router 800 may be designed to provide sufficient clearance for routing the wire 902 in transition from horizontal to vertical, and vice versa. In the embodiment of FIG. 9B, the wire router 800 helps maintain the wire 902 adjacent the vertical structural member 700 as it extends vertically.

Figure 10:
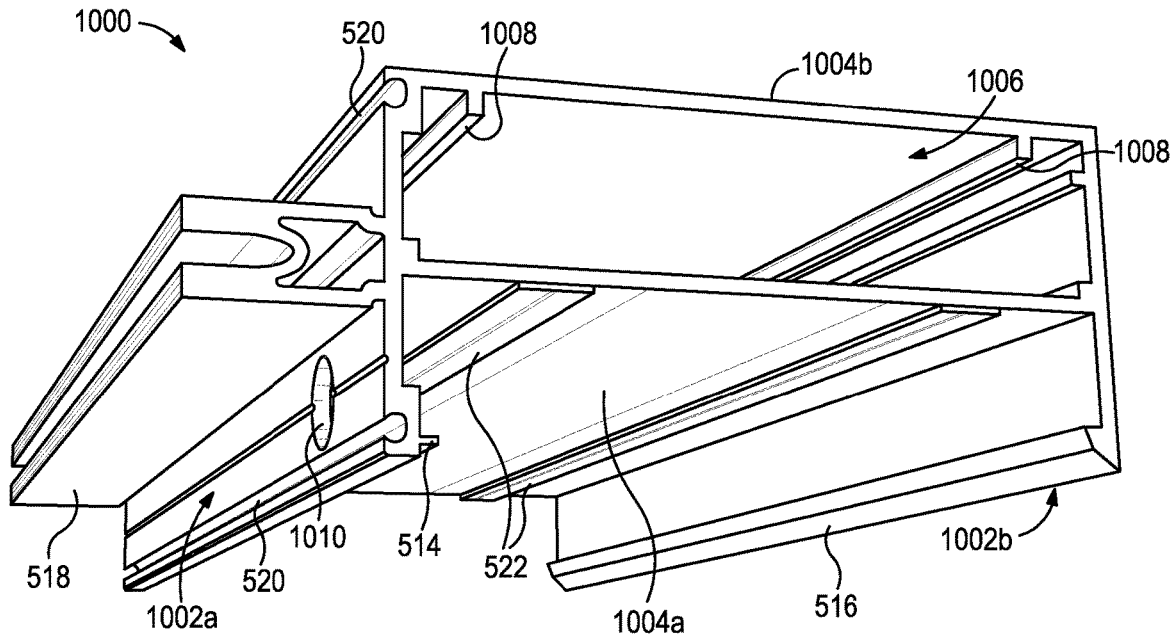
FIG. 10 is an isometric end view of another example structural member, according to one or more additional embodiments.

FIG. 10 is an isometric end view of another example structural member 1000, according to one or more additional embodiments. The structural member 1000 may be similar in some respects to the structural member 500 of FIG. 5, and therefore may be best understood with reference thereto, where like numerals will correspond to like components not described again in detail. Similar to the structural member 500, for example, the structural member 1000 may be oriented in either orientation, e.g., vertically or horizontally, and may function as a mullion in a window system or curtain wall and, therefore, may be used in the window system 202 of FIG. 2. The structural member 1000 may also be formed as a monolith, e.g., as an aluminum alloy extrusion, but could alternatively be made of other materials, without departing from the scope of the disclosure.

As illustrated, the structural member 1000 may include front and back faces 1002a and 1002b. One lateral end of the front face 1002a may define the raised lip 514 extending along the length of the front face 1002a, and one lateral end of the back face 1002b may define a corresponding tapered surface 516 extending along the length of the back face 1002b. As discussed above, the raised lip 514 and the tapered surface 516 may be used to attach a raceway cover (not shown) extending between the front and back faces 1002a,b. Moreover, the glazing panel support tongue 518 extends from the front face 1002a, and the lateral ends of the front face 1002a may provide the gasket recesses 520, as generally described above.

The structural member 1000 may further include first and second webs 1004a and 1004b that extend between the front and back faces 1002a,b. In some embodiments, as illustrated, the first web 1004a may provide or define the raised ribs 522 that provide a location where the shear block 400 (FIG. 4) may be aligned with the structural member 1000 when the structural member 1000 operates in a vertical orientation.

The webs 1004a,b may be laterally offset from each other such that a hollow space 1006 is defined therebetween. In the illustrated embodiment, a pair of laterally offset raised shoulders 1008 may be defined on the second web 1004b within the hollow space 1006 (interior) of the structural member 1000. In embodiments where the structural member 1000 is a horizontal structural member, the raised shoulders 1008 may be configured to engage the shear block 400 (FIG. 4) upon receiving the shear block 400 within the hollow space 1006 during installation. More specifically, the raised shoulders 1008 may be configured to engage the return members 422 (FIG. 4) of the shear block 400 and thereby provide a close-fit engagement that helps guide and center the structural member 1000.

In some embodiments, as illustrated, one or more wiring holes 1010 (one shown) may be defined in the front face 1002a of the structural member 1000. The wiring hole(s) 1010 facilitate passage of wiring through the front face 1002a to connect electrical devices on the exterior of the system.

Figure 11:
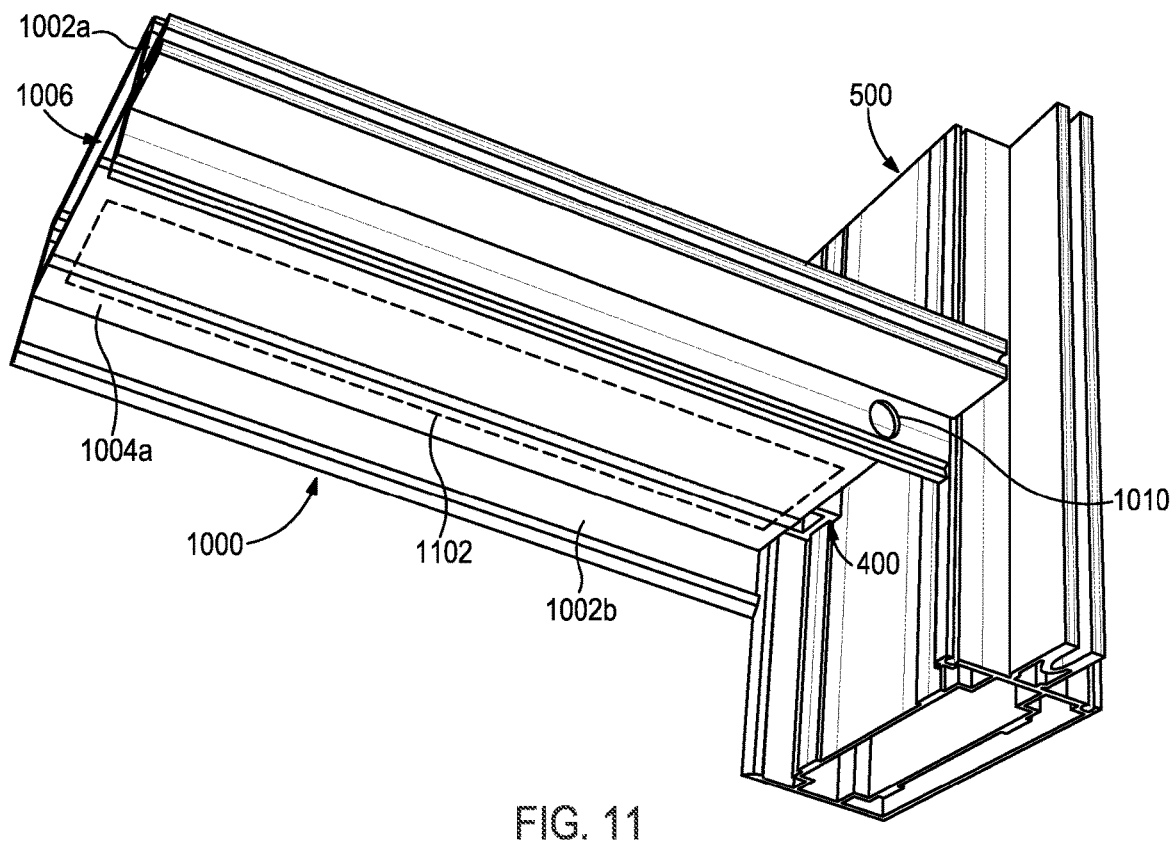
FIG. 11 is an isometric bottom view demonstrating example joining of the structural member of FIG. 10 to an example horizontal structural member, according to one or more embodiments.

FIG. 11 is an isometric bottom view demonstrating example joining of the structural member 1000 to the vertical structural member 500, according to one or more embodiments. In the illustrated embodiment, the structural member 1000 is operating as a horizontal structural member, and the shear block 400 (only partly visible) is attached to the vertical structural member 500 and received within the hollow portion 1006 to form a joint with the vertical structural member 500.

More specifically, the horizontal structural member 1000 may be secured to the shear block 400 by receiving the connector portion 404 (FIG. 4) of the shear block 400 within the hollow space 1006 of the horizontal structural member 1000. The horizontal structural member 1000 may be advanced toward the vertical structural member 500 until engaging or coming into close contact with the vertical structural member 500. Once properly aligned, one or more mechanical fasteners (not shown) may then be used to secure the horizontal structural member 1000 to the shear block 400 at the corresponding fastener apertures 410 (FIG. 4) provided by the connector portion 404.

In the illustrated embodiment, a location 1102 is provided where various electrical components, such as wires, drivers, controllers, etc., may be secured to the first web 1004a of the horizontal structural member 1000. Any wires included in the system may be run to and from devices that require power or generate power, and may extend through the wiring hole 1010, if needed. Advantageously, the height of the front and back faces 1002a,b allow for the interposition of larger electrical devices between the faces 1002a,b on the web 1004a.

Figure 12:
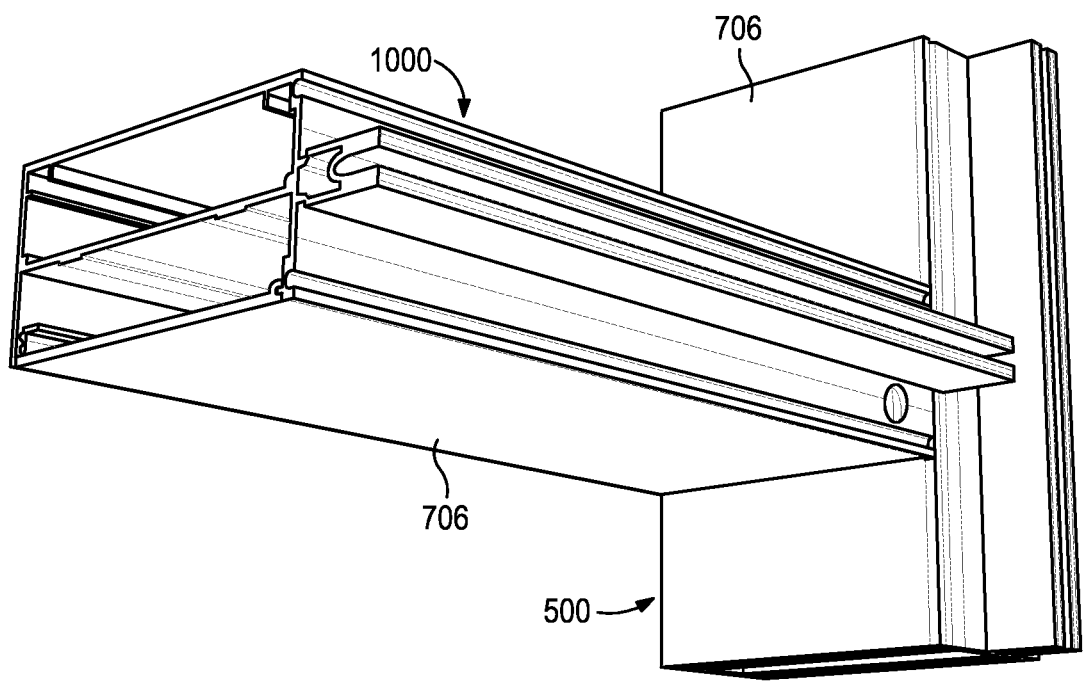
FIG. 12 is an isometric view of the horizontal structural member of FIG. 10 joined to the vertical structural member of FIG. 11, according to one or more embodiments.

FIG. 12 is an isometric view of the horizontal structural member 1000 joined to the vertical structural member 500, according to one or more embodiments. Once any wires or other electrical components are properly run, raceway covers 706 may be installed across each exposed web to thereby conceal (hide) the wires and electrical components. The raceway covers 706 may be installed as described above on the structural members 500, 1000, and may be easily removed to access the wires for replacement or removal. Accordingly, the design of the system allows easy and direct wiring of the full façade of a curtain wall before or after the shear block 400 and the horizontal structural member 1000 are installed.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Although various example embodiments have been disclosed, a worker of ordinary skill in this art would recognize that certain modifications would come within the scope of this disclosure. For that reason, the following claims should be studied to determine the scope and content of this disclosure.

What is claimed is:

1. A curtain wall system, comprising:
    a structural member providing front and back faces, and first and second webs extending between the front and back faces and laterally offset from each other to define a hollow space therebetween;
    a wire transfer channel defined at an end of the first web adjacent the front face and extending into the hollow space; and
    a shear block providing a base, a connector portion extending from the base in a first direction, and first and second legs extending from the base in a second direction opposite the first direction,
    wherein the first and second legs are attachable to the first web to couple the shear block to the structural member,
    wherein, when the shear block is attached to the structural member, a wire is traversable past the shear block through the wire transfer channel,
    wherein the first web includes a first surface extending in a first web direction and a second surface extending from the first surface away from the second web in a second web direction different than the first web direction, and
    wherein the first surface, the second surface, and the first face define the wire transfer channel.

2. The system of claim 1, wherein the first web defines raised ribs protruding outward from the first web, and wherein each leg defines a location channel alignable with a corresponding one of the raised ribs.

3. The system of claim 1, wherein the legs extend from the base and thereby define a wire channel between the base and the first web when the shear block is attached to the structural member, the system further including a wire extending through the wire channel and along the first web.

4. A curtain wall system, comprising:
    a structural member providing front and back faces, and first and second webs extending between the front and back faces, the front and back faces being laterally offset from each other and thereby defining a hollow space therebetween;
    a wire transfer channel defined at an end of the first web adjacent the front face and extending into the hollow space; and
    a shear block providing a base, a connector portion extending from the base in a first direction, and first and second legs extending from the base in a second direction opposite the first direction, wherein the first and second legs are attachable to the first web to couple the shear block to the structural member, and wherein each leg includes:
        a flange extending from the base in the second direction;
        a support surface extending from the flange, wherein a location channel is defined in the support surface; and
        a return member extending from the support surface in the first direction.

5. The system of claim 4, wherein the connector portion includes opposing sidewalls extending from the base in the first direction and terminating at an end wall extending between the sidewalls, and
    wherein the return member of each head extends parallel to and laterally offset from a corresponding one of the sidewalls, thereby defining a relief between each laterally adjacent return member and sidewall.

6. The system of claim 5, wherein a distal end of the return member tapers laterally inward toward an adjacent sidewall.

7. The system of claim 1, further comprising a wiring hole defined in the front face to accommodate a wire extending into the wire transfer channel from an exterior.

8. The system of claim 1, wherein a lateral end of each face provides a cover engagement feature, the system further including:
    a wire extending along the first web; and
    a raceway cover removably coupled to the cover engagement features and extending across the first web and thereby occluding the wire.

9. The system of claim 1, wherein the structural member is a first structural member, the system further comprising:
    a second structural member providing front and back faces, and first and second webs extending between the front and back faces of the second structural member, the first and second webs of the second structural member being laterally offset from each other to define a hollow space therebetween,
    wherein the connector portion is matingly received within the hollow space of the second structural member.

10. The system of claim 9, wherein each leg includes a flange extending from the base in the second direction, a support surface extending from the flange, and a return member extending from the support surface in the first direction, and wherein raised shoulders are defined within the hollow space and engageable with the return member of each leg.

11. The system of claim 10, wherein the connector portion includes opposing sidewalls extending from the base in the first direction and terminating at an end wall extending between the sidewalls, and wherein the return member of each leg extends parallel to and is laterally offset from a corresponding one of the sidewalls, thereby defining a relief between each laterally adjacent return member and sidewall, the system further comprising a wire router mounted to the shear block at the reliefs.

12. The system of claim 11, wherein the wire router includes:
first and second heads;
one or more cross bars extending between the first and second heads; and
an attachment mechanism provided on each head and at least partially receivable within the reliefs to removably couple the wire router to the shear block.

13. The system of claim 9, wherein the legs extend from the base and thereby define a wire channel between the base and the first web when the shear block is attached to the first structural member, the system further including a wire extending through the wire channel along the first web of the first structural member and turning to extend along the first web of the second structural member.

14. The system of claim 13, further comprising a raceway cover removably coupled to one of the first and second structural members and extending across the first web of the one of the first and second structural members and thereby occluding the wire.

15. A curtain wall system, comprising:
a first structural member providing front and back faces, and first and second webs extending between the front and back faces, the first and second webs defining a first hollow space therebetween, wherein a wire transfer channel is defined at an end of the first web adjacent the front face and extending into the first hollow space;
a shear block attached to the first web and providing a base, a connector portion extending from the base in a first direction, and first and second legs extending from the base in a second direction opposite the first direction; and
a second structural member defining a second hollow space that matingly receives the connector portion,
wherein, when the shear block is attached to the first web and the second structural member matingly receives the connector portion, a wire is traversable past the shear block through the wire transfer channel,
wherein the first web includes a first surface extending in a first web direction and a second surface extending from the first surface away from the second web in a second web direction different than the first web direction, and
wherein the first surface, the second surface, and the first face define the wire transfer channel.

16. The system of claim 15, wherein the first web defines raised ribs protruding outward from the first web, and wherein each leg defines a location channel aligned with a corresponding one of the raised ribs.

17. The system of claim 15, wherein each leg includes a flange extending from the base in the second direction, a support surface extending from the flange, and a return member extending from the support surface in the first direction, and wherein raised shoulders are defined within the second hollow space and engageable with the return member of each leg.

18. The system of claim 17, wherein the connector portion includes opposing sidewalls extending from the base in the first direction and terminating at an end wall extending between the sidewalls, and wherein the return member of each head extends parallel to and is laterally offset from a corresponding one of the sidewalls, thereby defining a relief between each laterally adjacent return member and sidewall, the system further comprising a wire router mounted to the shear block at the reliefs.

19. The system of claim 15, wherein the legs extend from the base and thereby define a wire channel between the base and the first web, the system further including a wire extending through the wire channel along the first web and turning to extend along the second structural member.

* * * * *